(12) United States Patent
Chen et al.

(10) Patent No.: US 11,035,802 B2
(45) Date of Patent: Jun. 15, 2021

(54) SURFACE DEFECT DETECTION SYSTEM AND METHOD THEREOF

(71) Applicants: Inventec (Pudong) Technology Corporation, Shanghai (CN); INVENTEC CORPORATION, Taipei (TW)

(72) Inventors: Trista Pei-Chun Chen, Taipei (TW); Wei-Chao Chen, Taipei (TW); Shih-Sung Lin, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 182 days.

(21) Appl. No.: 16/410,003

(22) Filed: May 13, 2019

(65) Prior Publication Data
US 2020/0292462 A1    Sep. 17, 2020

(30) Foreign Application Priority Data
Mar. 15, 2019    (CN) .......................... 201910198042.3

(51) Int. Cl.
*G01N 21/88*    (2006.01)
*G06T 7/00*    (2017.01)
(Continued)

(52) U.S. Cl.
CPC .......... *G01N 21/8851* (2013.01); *G01N 21/95* (2013.01); *G06T 7/0004* (2013.01);
(Continued)

(58) Field of Classification Search
CPC ............... G01N 21/8851; G01N 21/95; G01N 2021/8893; G01N 2021/8883;
(Continued)

(56) References Cited

U.S. PATENT DOCUMENTS

2017/0236266 A1    8/2017  Rostami et al.
2018/0002039 A1*   1/2018  Finn ..................... G07C 5/0808
(Continued)

OTHER PUBLICATIONS

Daniel Weimer et.al, Design of deep convolutional neural network architectures for automated feature extraction in industrial inspection, CIRP Annals—Manufacturing Technology, 65 (2016) 417-420.
(Continued)

*Primary Examiner* — Siamak Harandi
(74) *Attorney, Agent, or Firm* — Locke Lord LLP; Tim Tingkang Xia, Esq.

(57) ABSTRACT

A surface defect detection method applied to a surface of an object is disclosed. The method includes obtaining an image of the surface, performing a deep learning algorithm by a computing device to set a plurality of bounding boxes in the image and to output a plurality of feature parameter sets associated with the plurality of bounding boxes, with each bounding box enclosing a possible defect of the surface, and
(Continued)

performing a classifying algorithm by the computing device according to the bounding boxes and the feature parameters to determine whether the surface conforms to a specification.

9 Claims, 3 Drawing Sheets

(51) Int. Cl.
   *G01N 21/95* (2006.01)
   *G06T 7/11* (2017.01)
(52) U.S. Cl.
   CPC ........ G06T 7/11 (2017.01); *G01N 2021/8893* (2013.01); *G06T 2207/20081* (2013.01); *G06T 2207/20084* (2013.01)
(58) Field of Classification Search
   CPC .................. G06T 7/0004; G06T 7/11; G06T 2207/20084; G06T 2207/20081; G06T 2207/20021; G06T 7/0006
   See application file for complete search history.

(56) References Cited

U.S. PATENT DOCUMENTS

| | | | |
|---|---|---|---|
| 2018/0101945 A1 | 4/2018 | Stone et al. | |
| 2018/0144216 A1 | 5/2018 | Tsai et al. | |
| 2019/0073568 A1* | 3/2019 | He | G06K 9/6267 |
| 2019/0130189 A1* | 5/2019 | Zhou | G06K 9/00718 |
| 2019/0346375 A1* | 11/2019 | Anantha | G01N 21/9501 |

OTHER PUBLICATIONS

Pedro M. A. Vitoriano et.al, Automatic Optical Inspection for Surface Mounting Devices with IPC-A-610D compliance, Proceedings of the 2011 International Conference on Power Engineering, Energy and Electrical Drives, 2011.

Shaoqing Ren et.al, Faster R-CNN: Towards Real-Time Object Detection with Region Proposal Networks, IEEE Transactions on Pattern Analysis and Machine Intelligence, 2015.

Johannes Richter et al., On the Development of Intelligent Optical Inspections, European Union, 2017.

\* cited by examiner

# SURFACE DEFECT DETECTION SYSTEM AND METHOD THEREOF

CROSS-REFERENCE TO RELATED APPLICATIONS

This non-provisional application claims priority under 35 U.S.C. § 119(a) on Patent Application No(s). 201910198042.3 filed in China on Mar. 15, 2019, the entire contents of which are hereby incorporated by reference.

BACKGROUND

1. Technical Field

This disclosure relates to defect detection, and more particularly to a surface defect detection system and method thereof.

2. Related Art

Before a computer, such as a laptop or a tablet computer, is shipped, it needs to be inspected by quality control personnel for potential surface defects. Such quality control personnel will check for scratches, dents, and other surface defects specified in a specification. If the type and the severity of the surface defects are beyond what are allowed in the specification, the computer is then considered "failed", as oppose to "pass" in the surface defect detection test.

Traditionally, such surface defect detection task is carried out by human inspectors. They read and follow the specification to determine whether or not the inspected computer will pass or fail. Such a surface defect detection task requires a lot of human labors, and there are three drawbacks when using human inspectors.

The first drawback is imprecision. The human eye is not capable of making precise measurements, especially on a very small scale. When comparing two similar objects, the eye may not notice that one is slightly smaller or larger than the other. This concept also applies to characteristics such as surface roughness, size, and any other factor that needs to be measured. Since the specification is mostly written in the form of size thresholds, human vision is not a precise tool for the measurement task.

The second drawback is unreliability. Some surface defects specified in the specification require very fine human vision. The defects can be very sophisticated, e.g., small in size, or tricky, e.g. easily confused with the computer surface texture. In addition, it's known that human eyes can be tricked by optical illusions. Therefore, human visual inspections are not always reliable.

The third drawback is inconsistency. Humans are subject to fatigue or loss of concentration. For example, the human inspector may be tired or out of focus when the shift is approaching the end. Surface defects may be bypassed without being spotted. Therefore, a defected computer is then passed as a good product and the quality of the computers coming out of the inspection station varies from time to time. In addition, different human inspectors also have different judgments, thus resulting in varying product quality coming out of the inspection station.

In addition, the defect detection method conventionally used in the SMT (surface mount technology) line or PCB (printed circuit board) is template matching or computer-vision method. However, both the template matching and computer-vision methods are not only prone to geometric registration error but also hard to configure when the number of defect types increases. The situation only worsens when the defect cannot be precisely described with geometric language or rules. On the other hand, human inspectors can still find defects in a misaligned sample. They can also spot defects that cannot be easily described by rules, such as surface contaminations by fingerprint or dirt, and defects by abrasions or scratches. However, human inspectors have drawbacks as described previously. In overall, no matter human inspectors, template matching or computer-vision method may not be completely capable of all the requirements in a process of surface defect detection.

SUMMARY

According to one or more embodiment of this disclosure, a surface defect detection method applied to a surface of an object comprising: obtaining an image of the surface by a camera device; performing a deep learning algorithm by a computing device to set a bounding box in the image and to output a feature parameter set associated with the bounding box, with the bounding box enclosing a defect of the surface; and performing a classifying algorithm by the computing device according to the bounding box and the feature parameter set to determine whether the surface conforms to a specification.

A surface defect detection system applied to a surface of an object comprising: a camera device configured to obtain an image of the surface; a computing device electrically connecting to the camera device, wherein the computing device is configured to perform a deep learning algorithm to set a bounding box in the image and output a feature parameter set associated with the bounding box, the bounding box encloses a defect of the surface, and the computing device is further configured to perform a classifying algorithm according to the bounding box and the feature parameter set to determine whether the surface conforms to a specification; and a back-end processing device electrically connecting to the computing device, wherein the back-end processing device is configured to perform an operation associated with the surface according to a determination result of the computing device.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The present disclosure is adapted to detect a defect of a surface LS of an object. Said surface LS is substantially similar to a plane, however, the plane may have a height difference within the specified range. Practically, the present disclosure may be used to detect a top cover, a palm reset (the flat area of the internal surface of the laptop except for the keyboard and touchpad) of a laptop, or a touch panel of a tablet computer.

Figure 1:
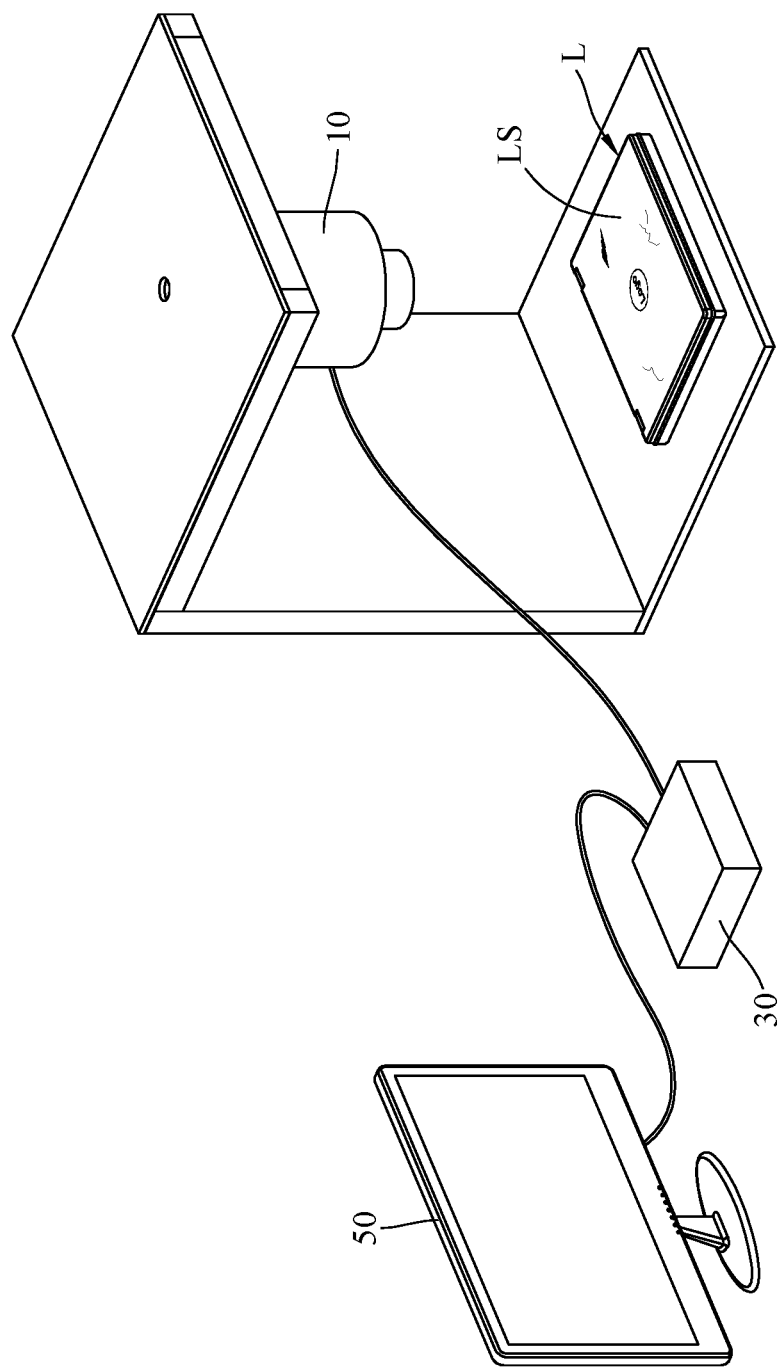
FIG. 1 is an architecture diagram of the surface defect detection system according to an embodiment of the present disclosure.

Please refer to FIG. 1, which illustrates a schematic diagram of an architecture of the surface defect detection system 100 according to an embodiment of the present disclosure. Said surface defect detection system 100 comprises a camera device 10, a computing device 30, and a back-end processing device 50, wherein the computing device electrically connects to the camera device 10 and the back-end processing device 50 as shown in FIG. 1.

The camera device 10 is configured to obtain an image of the surface LS of the object L. Practically, a light emitting device may be installed around the object L to form uniform lighting, thus the camera device 10 obtains a clear image.

The computing device 30 determine whether the surface LS conforms to a specification according to the image of the surface LS. In other words, the computing device 30 determines whether the number of the defect or the severity of the defect is in a tolerable range defined in the specification.

The back-end device 50 is configured to perform an operation associated with the surface LS according to a determination result of the computing device 30. As shown in FIG. 1, the back-end device 50 is such as a monitor, which is able to display the determination result of the computing device 30 to be viewed by the operators on a production line.

Specifically, the determination of the computing device 30 has divided into two stages. The first stage detects defects based on deep learning, the second stage is a classification based on machine learning. The output data of the first stage is the input data of the second stage.

In the first stage, the computing device 30 performs a deep learning algorithm to set a plurality of bounding boxes from the image and outputs a plurality of feature parameter sets associated with the bounding boxes, with each bounding box corresponding to a feature parameter set. Each of the feature parameter sets comprises one or more feature parameters. Each of the bounding boxes encloses a defect of the surface LS. The defect type comprises a scratch, an abrasion, a dent, or a smudge.

The deep learning algorithm is a defect detection model which is trained by a region-based convolutional neural network (R-CNN) in advance. The R-CNN is, for example, Fast R-CNN, Faster R-CNN, Mask R-CNN, or YOLO (You Only Look Once) or SSD (Single Shot Detection). It should be noticed that the above enumerates examples adapted to the deep learning algorithm, but is not a limitation of the deep learning algorithm that can be adopted in the present disclosure. In an embodiment of the present disclosure, it adopts Faster R-CNN to train the defect detection model, this algorithm has a great performance on recognition speed and accuracy.

In an embodiment of the present disclosure, each of the bounding boxes is a rectangle. However, the bounding box may be an irregular shape if the present disclosure adopts a deep learning algorithm that can set around the shape of the defect. The feature parameters comprise an area of the rectangle, a diagonal length of the rectangle, a confidence degree, and a defect type. The confidence degree adopts "percentage" to refer to the degree of conformity of the defect in the bounding box.

In the second stage, the computing device 30 performs a classifying algorithm according to the bounding boxes and feature parameters outputted in the first stage to determine whether the surface LS conforms to a specification.

In an embodiment, the computing device 30 refers to a number of and an area ratio as the input data. The number is associated with the plurality of bounding boxes set in the first stage. The ratio is associated with a total area of the plurality of bounding boxes set in the first stage and an area of the surface LS. However, using two-dimensional data described above to perform the classifying algorithm is not a limitation of the present disclosure.

For example, said classifying algorithm is a binary classification model trained by machine in advance and said machine performing one of Decision Tree, SVM (support vector machine), and KNN (K nearest neighbor). The classification model is used to determine whether the surface LS is pass or fail. In an embodiment of the present disclosure, SVM is adopted to train the classification model.

The computing device 30 adopts NVIDIA Jetson TX2 on the production line and loads the trained Faster R-CNN model and SVM model from the cloud server. In a practical inspection, rather than connecting to the server, the defect of the surface LS can be determined immediately on the production line. Therefore, the speed of defect determination is increased and the time and cost of additionally transmitting images to the cloud server are also saved. However, it should be noticed that the computing device 30 disclosure can be the cloud server itself. The present disclosure is not limited to the hardware type of the present disclosure.

Figure 2:
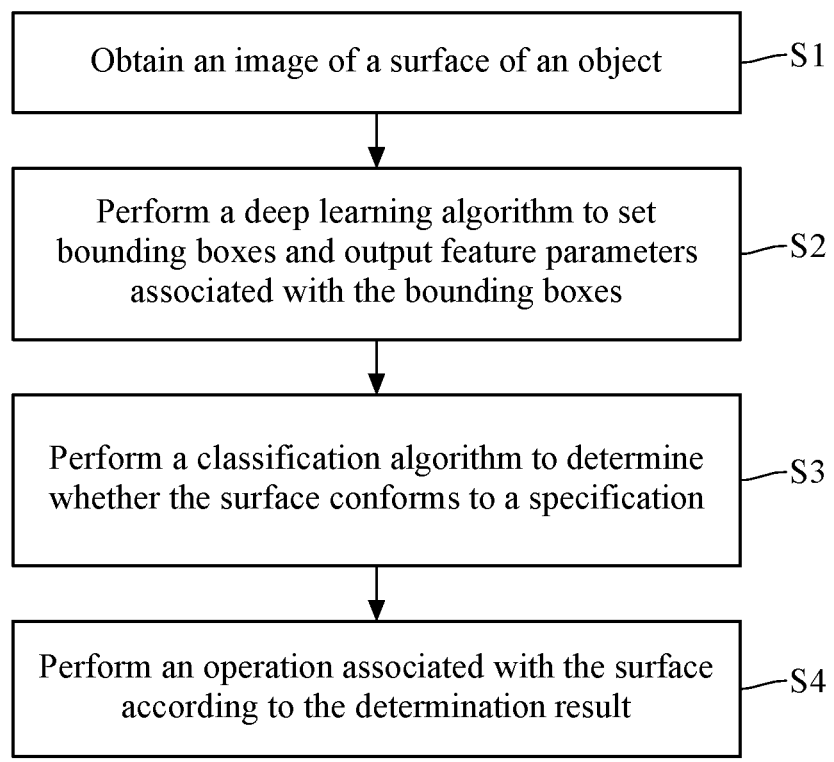
FIG. 2 is a flow chart of the surface defect detection method according to an embodiment of the present disclosure.

Please refer to FIG. 2, which illustrates the flow of surface defect detection. Please refer to step S1. The camera device 10 obtains the image of the surface LS of the object L.

Please refer to step S2. The computing device 30 performs the deep learning algorithm to set a plurality of bounding boxes in the image and to output a plurality of feature parameters associated with the bounding boxes respectively, with each of the bounding boxes enclosing a defect of the surface LS.

Figure 3:
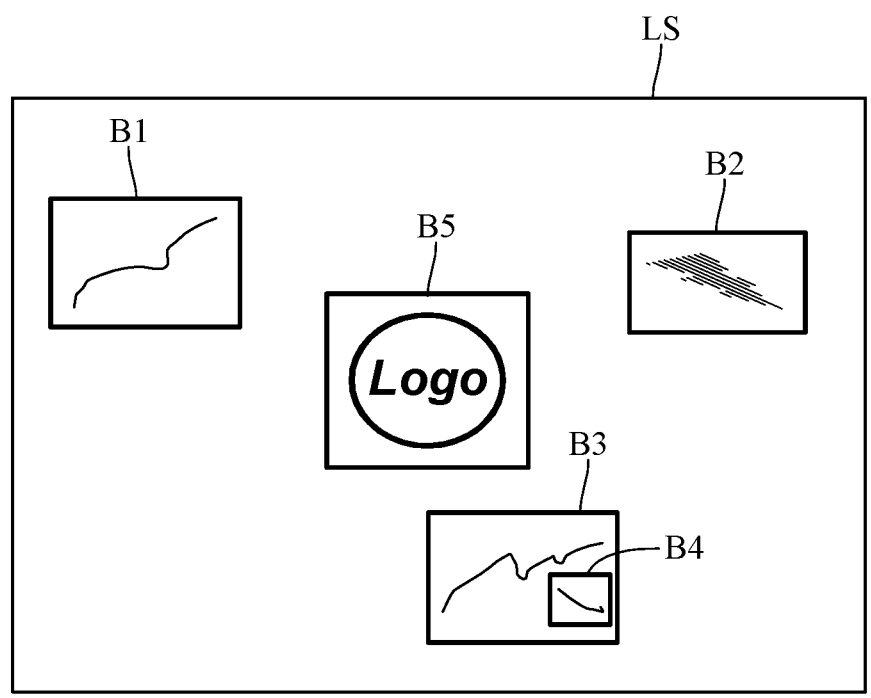
FIG. 3 illustrates the sample bounding boxes and the exception region indicated on the surface of the object.

Please refer to FIG. 3, which is a schematic diagram of the deep learning algorithm for setting the bounding boxes B1 to B4 and the exception region B5 on the image of the surface LS. The bounding box B1 encloses a defect. The bounding box B2 encloses an abrasion or a splash. It should be noticed that the deep learning algorithm individually labels for each defect, regardless of whether the labeled bounding boxes are overlapping. For example, bounding boxes B3 and B4 with an overlapped part belong to two defects respectively in FIG. 3.

Please refer to FIG. 4. The back-end processing device 50 performs the operation associated with the surface LS according to a determination result of the computing device 30. For example, the back-end processing device 50 uses the monitor shows the determination result or uses the conveyor device to distinguish the passing and fail surface LS.

In another embodiment, before the image is obtained in step S1, the method of the present disclosure further comprises: generating uniform lighting around the object L by a light emitting device. Therefore, the image of the surface LS obtained by the camera device 10 can be less affected by the ambient light.

In another embodiment, before the deep learning algorithm is performed in step S2, the method of the present disclosure further comprises: setting an exceptional region (such as B5 in FIG. 3) in the image by the computing device 30, wherein the bounding box does not overlap with the exceptional region. The exceptional region B5 is, for example, the brand name on the laptop's top cover. The deep learning algorithm does not perform any defect detection in the exceptional region B5.

In another embodiment, before the deep learning algorithm is performed in step S2, the method of the present disclosure further comprises: obtaining a plurality of training images and corresponding training parameters by a server.

The source of said training comprises images with the defect of the surface LS of the object and the images without the detect of the surface LS of the object. In the first training, it needs at least 500 train images with the defect of the surface LS of the object and at least 100 images without the defect of the surface LS of the object. In should be noticed that the number described is proposed as an example, and the number is not a limitation of the present disclosure.

The training parameter comprises the sample bounding box and corresponding label of defect type. The sample bounding box is a rectangle enclosing the defect.

After obtaining the training images and corresponding training parameters, the server may perform a deep learning algorithm to generate a defect detection model according to these training data.

In addition, each of the training images has an indication of the first image and the second image alternatively. The indication of the first image represents that the image conforms to a specification. The indication of the second image represents that the image does not conform to the specification. For example, For example, 100 images that originally have no defects are generally labeled as the first image. In 500 images that have the defect, there may be 150 images are labeled as the first image because the number of defects in each of the 150 images is small or the total defect area of each image is small. In other words, the remaining 350 images are indicated as the second image. Therefore, in all 600 images, there are 250 images are indicated as the first image and 350 images are indicated as the second image. The server performs a classification algorithm according to these training images and their respective indications to generate a classification model.

The computing device 30 loads the defection model and the classification model after their training tasks are done. The computing device 30 perform these two model respectively in step S2 and step S3, and the defect detection of the surface LS is then performed.

Practically, the defect detection model may adopt the data used for actual detection as training data to update the model, thereby improving the accuracy of defect detection.

In addition, during the training process, each of the training images may be divided into multiple sub-images to reduce the data throughput processed by the server.

In summary, the surface defect detection system and method thereof disclosed by the present disclosure can accurately set various types of defects on the surface of an object by the deep learning algorithm, and determines if the surface may pass for the surface defect testing by the classification algorithm according to the specification. The present disclosure can avoid the inaccuracy, unreliability and inconsistency problems caused by human inspectors, and maintain fast detection speed.

What is claimed is:

1. A surface defect detection method applied to a surface of an object, comprising:
    obtaining an image of the surface by a camera device;
    performing a deep learning algorithm by a computing device to set a bounding box in the image and to output a feature parameter set associated with the bounding box, with the bounding box enclosing a defect of the surface;
    performing a classifying algorithm by the computing device according to the bounding box and the feature parameter set to determine whether the surface conforms to a specification;
    before the computing device performs the classifying algorithm, setting another bounding box in the image and outputting another feature parameter set associated with said another bounding box by the computing device, with said another bounding box enclosing another defect of the surface;
    calculating a number of the bounding boxes set by the deep learning algorithm; and
    calculating a ratio of a total area of the bounding boxes set by the deep learning algorithm and an area of the surface;
    wherein performing the classifying algorithm by the computing device comprises determining whether the surface conforms to the specification according to the number and the ratio by the computing device.

2. The surface defect detection method of claim 1, wherein the deep learning algorithm is a region-based convolutional neural network (R-CNN).

3. The surface defect detection method of claim 2, wherein the R-CNN is Fast R-CNN, Faster R-CNN, Mask R-CNN, or YOLO.

4. The surface defect detection method of claim 1, wherein the bounding box is a rectangle, the feature parameter set comprises an area of the rectangle, a diagonal length of the rectangle, a confidence degree, and a defect type, and the defect type comprises a scratch, an abrasion, a dent, or a smudge.

5. The surface defect detection method of claim 1, wherein the classifying algorithm is one of Decision Tree, SVM, and KNN.

6. The surface defect detection method of claim 1 further comprising:
    before the deep learning algorithm is performed, setting an exceptional region in the image by the computing device, wherein the bounding box does not overlap with the exceptional region.

7. The surface defect detection method of claim 1 further comprising:
    before the image is obtained, generating uniform lighting around the object by a light emitting device.

8. The surface defect detection method of claim 1 further comprising:
    before the deep learning algorithm is performed, obtaining a plurality of training images by a server; wherein the plurality of training images comprises a plurality of images of another surface with another defect and a plurality of images of further another surface without a defect, each of the plurality of images with the defect has a sample bounding box and a defect type, the sample bounding box is a rectangle enclosing the defect, and the defect type is associated with the defect; wherein each of the training images has either a first indication or a second indication, the first indication represents the training image conforms to the specification, and the second indication represents the training image does not conform to the specification;

performing the deep learning algorithm according to the plurality of training images, the plurality of sample bounding boxes, and the plurality of defect types by the server to generate a defect detection model;

performing the classifying algorithm according to each of the plurality of training images with the first or second indication by the server to generate a classification model; and loading the defect detection model and the classification model from the server by the computing device.

9. A surface defect detection system applied to a surface of an object, comprising:

a camera device configured to obtain an image of the surface;

a computing device electrically connecting to the camera device, wherein the computing device is configured to perform a deep learning algorithm to set a bounding box in the image and output a feature parameter set associated with the bounding box, the bounding box encloses a defect of the surface, and the computing device is further configured to perform a classifying algorithm according to the bounding box and the feature parameter set to determine whether the surface conforms to a specification; and a back-end processing device electrically connecting to the computing device, wherein the back-end processing device is configured to perform an operation associated with the surface according to a determination result of the computing device; wherein the deep learning algorithm is a region-based convolutional neural network (R-CNN); the deep learning algorithm is a region-based convolutional neural network (R-CNN);

the classifying algorithm is one of Decision Tree, SVM, and KNN; and the computing device is further configured to set another bounding box in the image, output another feature parameter set associated with said another bounding box, and perform the classifying algorithm according to a number and a ratio; wherein said another bounding box encloses another defect of the surface;

the number is associated with the plurality of bounding boxes set by the deep learning algorithm; and the ratio is associated with a total area of the plurality of bounding boxes set by the deep learning algorithm and an area of the surface.

* * * * *